United States Patent [19]

Dohse et al.

[11] Patent Number: 5,042,626
[45] Date of Patent: Aug. 27, 1991

[54] ARRANGEMENT FOR ACTUATING A BRAKING DEVICE FOR BRINGING A MOTOR-DRIVEN WORK TOOL OF A WORK APPARATUS TO STANDSTILL

[75] Inventors: Hans-Peter Dohse, Kernen-Rommelshausen; Jochen Kramer, Waiblingen-Hohenacker, both of Fed. Rep. of Germany

[73] Assignee: Andreas Stihl, Waiblingen, Fed. Rep. of Germany

[21] Appl. No.: 587,065

[22] Filed: Sep. 24, 1990

[30] Foreign Application Priority Data

Sep. 27, 1989 [DE] Fed. Rep. of Germany ....... 3932137

[51] Int. Cl.$^5$ .............................................. B60K 41/20
[52] U.S. Cl. ................... 192/1.29; 74/480 R; 92/1.4; 92/1.52
[58] Field of Search ............ 192/1.29, 1.26, 1.36, 192/1.4, 1.52, 1.63; 74/480 R

[56] References Cited

U.S. PATENT DOCUMENTS

| | | | |
|---|---|---|---|
| 2,200,973 | 5/1940 | Struck | 192/1.63 X |
| 2,643,518 | 6/1953 | Righter | 192/1.63 X |
| 2,902,123 | 9/1959 | Brugidou | 192/1.63 |
| 3,101,822 | 8/1963 | Clemens | 192/1.52 |
| 3,386,542 | 6/1968 | Cummings | 192/1.29 |
| 4,683,660 | 8/1987 | Schurr | 30/382 |

FOREIGN PATENT DOCUMENTS 294221 8/1928 United Kingdom ............... 192/1.63

*Primary Examiner*—Rodney H. Bonck
*Attorney, Agent, or Firm*—Walter Ottesen

[57] ABSTRACT

The invention is directed to an arrangement for actuating a braking device for bringing a motor-driven work tool of a work apparatus to standstill. The braking device is actuated by a brake lever and the brake lever is connected to a pivotably journalled throttle lever via a first actuator. The throttle lever controls the carburetor of the engine driving the work apparatus via a second actuator. In order to bring the work tool rapidly to standstill in idle, the second actuator is attached to a drag lever which is pivotable relative to the throttle lever. After passing through an idle movement path, the throttle lever takes the drag lever along via a follower in a pivot direction.

9 Claims, 5 Drawing Sheets

ARRANGEMENT FOR ACTUATING A BRAKING DEVICE FOR BRINGING A MOTOR-DRIVEN WORK TOOL OF A WORK APPARATUS TO STANDSTILL

FIELD OF THE INVENTION

The invention relates to an arrangement for actuating a braking device for bringing a motor-driven work tool of a work apparatus to standstill. The braking device is actuated by a brake lever which is connected to a pivotally journalled throttle lever via a first actuating member. A second actuating member is actuated by the throttle lever for controlling the motor speed.

BACKGROUND OF THE INVENTION

In portable handheld work apparatus such as a motor-driven chain saw, a safety braking device is provided which brings the running saw chain to standstill in response to a kickback of the chain saw. The saw chain is driven by a drive sprocket which is connected to a clutch drum of a centrifugal clutch so as to rotate therewith. A brake band wraps around the clutch drum and is actuated by a brake lever. The brake band is loaded with force when it is in its braking position (contact engagement with the clutch drum). The braking device is transferred into the braking position by a trigger (hand guard) in response to a kickback.

U.S. Pat. No. 4,683,660 discloses a braking arrangement wherein the saw chain is connected to the throttle lever in the handle via the pull wire of a Bowden cable. The throttle flap of the carburetor of the engine is actuated via a second actuator acting on the throttle lever in order to control the engine speed. When the throttle lever is pivoted, the braking device is first released via the first actuator (pull wire of the Bowden cable) and the throttle flap is simultaneously opened via the second actuator so that the engine speed can increase. When the throttle lever is released, the braking device is again transferred into the braking position so that a running down of the work tool, namely the saw chain, is prevented.

Since the braking device is simultaneously released with the throttle lever and the engine speed is increased, it cannot be precluded that the centrifugal clutch is engaged when the brake band is still partially in contact engagement with the clutch drum thereby causing the clutch drum to be driven. On the one hand, this causes a high wear of the braking device and leads on the other hand, to a considerable thermal load on the centrifugal clutch which can have consequences for the operation thereof. If the braking torque developed by the partially applied brake band is greater than the drive torque, then the centrifugal clutch will slip whereby its wear will be increased and a thermal overload cannot be precluded. When releasing the throttle lever, the braking device is applied immediately and the throttle flap is closed. The speed of the engine is first higher than the idle speed because of the inertia of the moved masses and it is for this reason that the above described conditions can occur even when releasing the throttle lever.

SUMMARY OF THE INVENTION

It is an object of the invention to provide an arrangement for actuating a braking device for bringing a motor-driven work tool of a work apparatus to standstill wherein a high engine speed with a partially applied braking device is reliably avoided.

The arrangement of the invention is for actuating a braking device for braking a movable work tool of a work apparatus so as to bring the work tool to standstill. The work apparatus has a motor for driving the work tool and the arrangement includes: a brake lever operatively connected to the braking device so as to be movable between a brake-applied position wherein the braking device brakes the work tool and a brake-released position wherein the braking device releases the work tool so as to permit movement thereof; a throttle lever pivotally mounted on the work apparatus so as to be movable over a path between a rest position and a full-throttle position; first actuator means connecting the throttle lever to the brake lever for moving the brake lever into the brake-released position when the throttle lever moves from the rest position toward the full-throttle position; a drag lever pivotally mounted on the work apparatus so as to be pivotally movable relative to the throttle lever and between a rest position and a full-throttle position; second actuator means connecting the drag lever to the motor for controlling the speed of the motor in dependence upon the movement of the drag lever; and, releasable engaging means for permitting the throttle lever to releasably engage the drag lever after the throttle lever has moved over a predetermined portion of the path thereby controlling the speed of the motor via the drag lever and the second actuator means.

Separating the second actuator for controlling the engine speed from the throttle lever achieves the condition that the throttle lever can be pivoted for releasing the braking device without having to actuate the second actuator. The second actuator which acts on the drag lever is only actuated after passing through an idle movement, which is adequate to release the braking device, and when a recess on the throttle lever comes into contact engagement with a follower on the drag lever and takes along the drag lever in the pivoting direction for increasing engine speed.

According to a feature of the invention, the drag lever can be placed in a half-throttle position. After the drag lever is fixed in position, the throttle lever can be released so that the latter returns to its rest position in which the braking device is applied, that is, the work tool is brought to standstill. In this half-throttle position of the drag lever, it is then possible to start the engine driving the work tool without the danger of injury to the operator.

BRIEF DESCRIPTION OF THE DRAWINGS

The invention will now be described with reference to the drawings wherein:

FIG. 3b shows the braking device of FIG. 2b with the throttle lever partially depressed in correspondence to FIG. 3a;

FIG. 4b shows the braking device of FIG. 2b with the throttle lever fully depressed in correspondence to FIG. 4a;

FIG. 5a is a view of the handle portion of FIG. 2a with the drag lever fixed in the half-throttle position and with the throttle lever released; and, FIG. 5b shows the braking device of FIG. 2b with the drag lever being in the fixed position and the throttle lever being released in correspondence to FIG. 5a.

DESCRIPTION OF THE PREFERRED EMBODIMENTS OF THE INVENTION

Figure 1A:
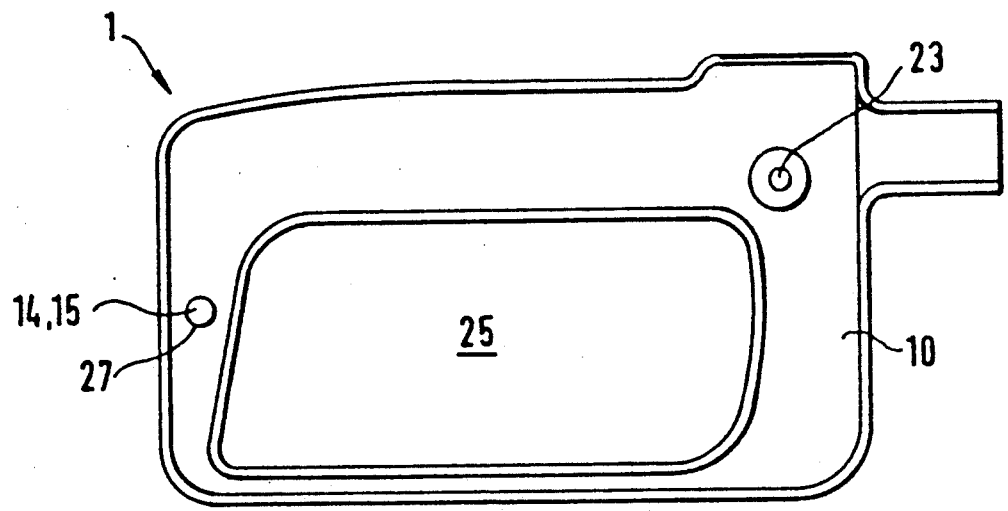
FIG. 1a is a section taken through the handle portion of a work apparatus.

The arrangement according to the invention and shown in the drawings can, for example, be applied to bring a motor-driven work tool of a work apparatus to standstill such as in a portable handheld work apparatus which can include hedge clippers, motor-driven chain saws, cut-off machines or the like. Work apparatus of this kind can be equipped with an internal combustion engine such as a two-stroke engine as the drive motor. The arrangement of an electric motor can likewise be useful. A throttle lever is journalled in the handle of the work apparatus and the throttle flap of the carburetor of the engine can be actuated, for example, via the throttle lever for controlling engine speed.

Figure 1B:
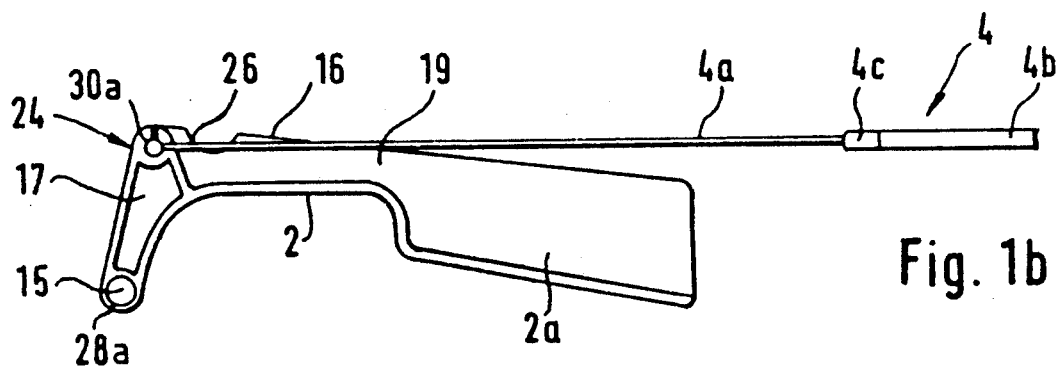
FIG. 1b is a view of the throttle lever journalled in the handle portion with a Bowden cable being connected to the throttle lever.
Figure 1C:
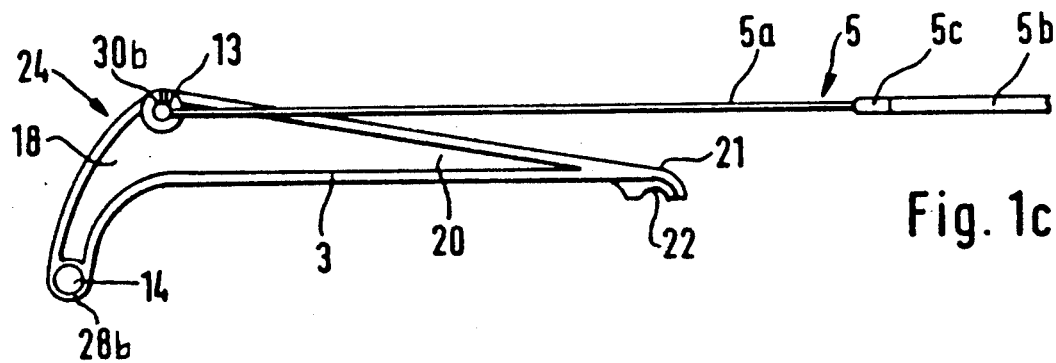
FIG. 1c is a view of the drag lever journalled in the handle portion with a Bowden cable connected to the drag lever.

A holding portion 1 of such a handle is shown in FIG. 1a. The holding portion 1 includes a frame 10 surrounding a hold opening 25 with the frame 10 being configured as a hollow frame. A pin 27 projects into the frame and is preferably fixed therein. The pin 27 defines the pivot axis 14 of a throttle lever 2 and the pivot axis 15 of a drag lever 3 (see FIGS. 1b and 1c).

The throttle lever 2 is configured as an L-shaped lever having a shorter leg 17 which is provided with a bearing opening 28a at its free end for accommodating the bearing pin 27. In the same manner, the drag lever 3 is configured as an L-shaped lever having a shorter leg 18 which likewise has a bearing opening 28b at its free end for receiving the pivot pin 27.

The longer leg 19 of the throttle lever 2 is widened at its free end portion where a grip portion 2a (FIG. 2a) is formed which projects into the hold opening 25.

A latch recess 22 is provided in the free end 21 of the longer leg 20 of the drag lever 3 for engaging a latch pin 23 (FIG. 1a) with the latch pin 23 being displaceable into the pivot plane.

An attachment opening 30a is provided in the connecting area 24 of the shorter leg 17 for the end of the pull wire 4a which is guided in the Bowden cable casing 4b. An attachment opening 30b is also provided in the connecting area of the shorter leg 18 and the longer leg 20 of the drag lever 3 for the end of the pull wire 5a guided in the Bowden cable casing 5b.

The Bowden cable comprising the pull wire 4a and the casing 4b defines a first actuator 4 which is actuated by the throttle lever 2. On the other hand, the Bowden cable comprising the pull wire 5a and the casing 5b defines a second actuator which is actuated by the drag lever 3.

Figure 2A:
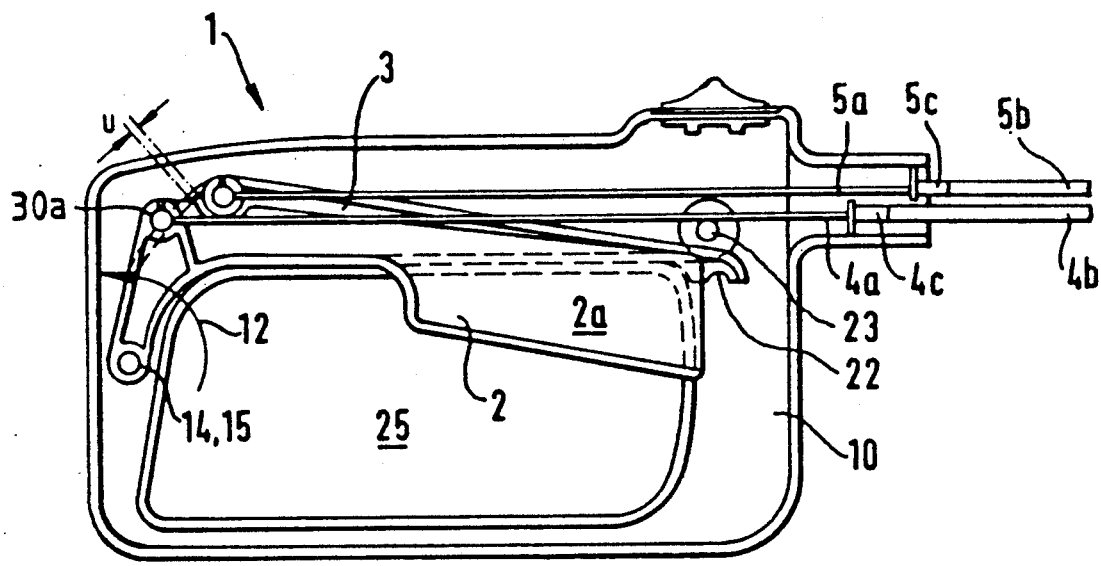
FIG. 2a is a view taken through the handle portion showing the throttle lever and drag lever arranged therein.

In FIG. 2a, the arrangement of the throttle lever 2 and of the drag lever 3 are shown in the handle portion 1. The bearing openings (28a, 28b) of the respective levers 2 and 3 are penetrated by a common bearing pin 27. For this reason, the pivot axes 14 and 15 of the two levers are identical. Both levers 2 and 3 pivot in mutually parallel pivot planes about the bearing pin 27. In FIG. 2a, the drag lever 3 is shown disposed behind the throttle lever 2.

Figure 3A:
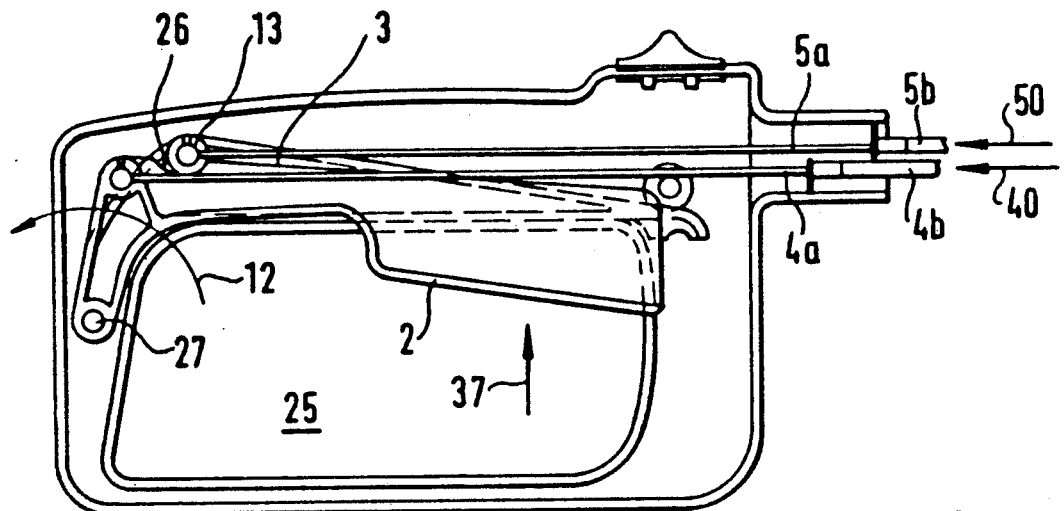
FIG. 3a corresponds to FIG. 2a but with the throttle lever shown in the partially depressed position.

The edge surrounding the attachment opening 30b of the drag lever 3 is preferably configured as a cylindrical follower 13 which extends perpendicularly to the pivot plane of the drag lever 3 and which overlaps the edge of the throttle lever 2. A recess 26 is formed in the edge 16 of the throttle lever 2 which is overlapped by the follower 13. The recess 26 corresponds to the follower 13 and is configured to have a shape which is in part circular. The diameter of the recess 26 is greater than the outer diameter of the cylindrical follower 13 so that in the rest position of the throttle lever 2 and the drag lever 3 shown in FIG. 2a, the follower 13 is partially surrounded by the recess 26 with a play (u). If the grip portion 2a of the throttle lever 2 projecting into the handle opening 25 is pivoted in the direction of arrow 12 (FIG. 3a) by pressing, then, after passing through an idle path, the edge of recess 26 comes into contact engagement with the follower 13 so that the throttle lever 2 takes the drag lever 3 along in the direction of arrow 12.

The Bowden cable casing 4b of actuator 4 is braced at its handle end 4c on the frame 10 while the Bowden cable casing 5b of actuator 5 is fixedly braced on frame 10 at its handle end 5c. The respective other ends of the casings 4b and 5b are fixedly braced on the housing. Accordingly, the end 4d (FIG. 2b) lies against a stop 29 of the work tool fixed to the housing. The pull wire 4a of the actuator 4 is attached with its end to an arm 34 of a two-arm brake lever 6 which is pivotable about a pivot axis 31.

Figure 4A:
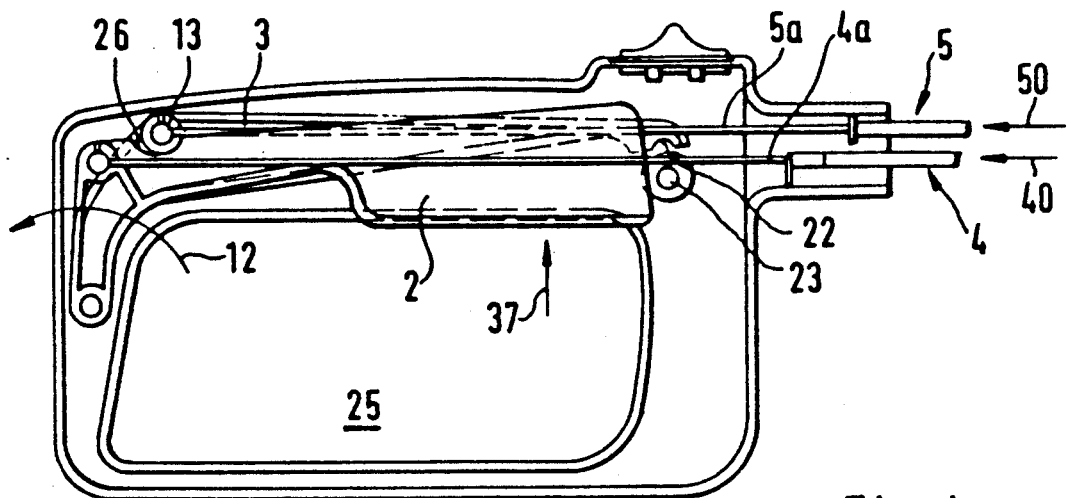
FIG. 4a corresponds to FIG. 2a with the throttle lever fully depressed.
Figure 4B:
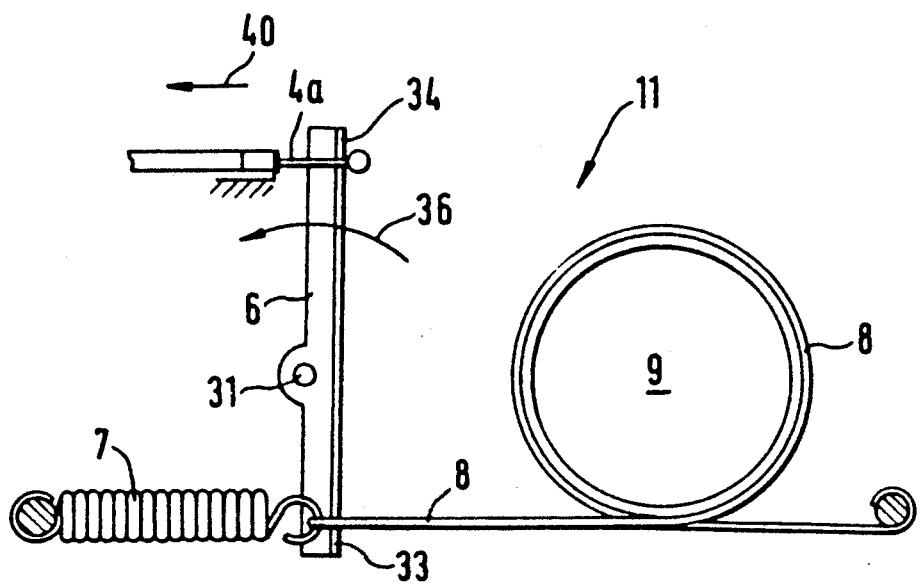
Figure 5A:
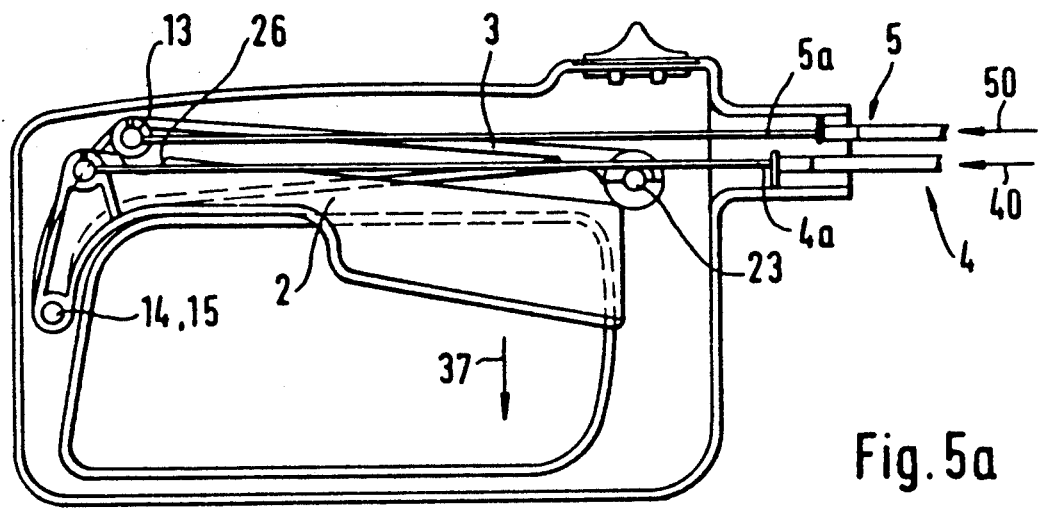
Figure 5B:
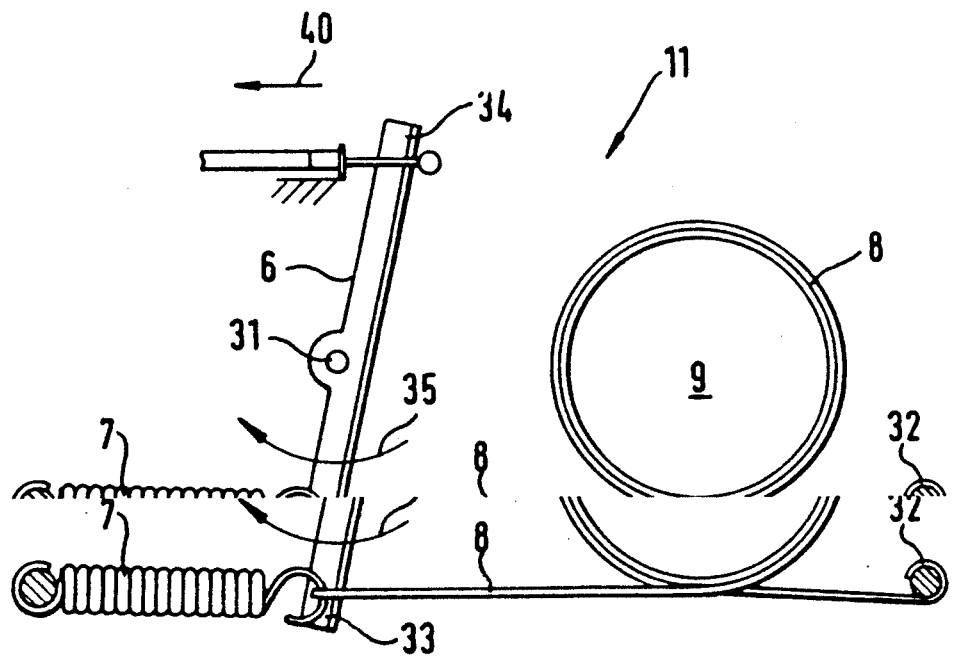

The other arm 33 of the brake lever is connected to the one end of a brake band 8 and the other end of the brake band is fixed to a stop 32 fixedly attached to the housing as shown in FIGS. 4b and 5b. The brake band 8 is looped around the clutch drum 9 of a centrifugal clutch which is driven by the engine of the work apparatus. The clutch drum 9 is mounted so as to rotate with a work tool of the work apparatus.

Figure 2B:
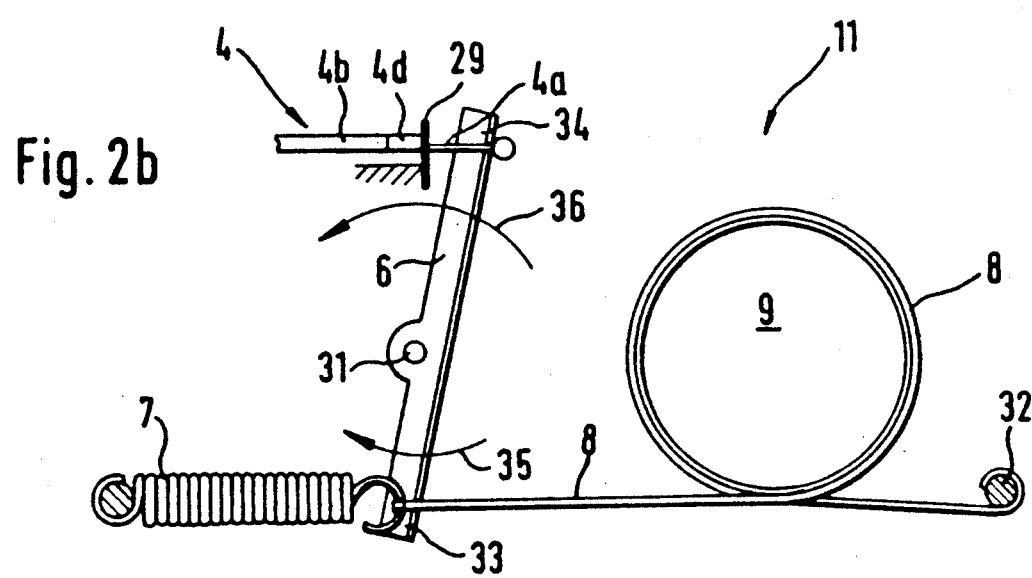
FIG. 2b is a schematic representation of a braking device actuable by the throttle lever via the Bowden cable.

A brake spring 7 attached to the housing acts on the free end of the arm 33 and pivots the brake lever 6 in the direction of arrow 35 whereby the brake band 8 is pulled tightly onto the clutch drum 9 so as to brake the latter. In this way, the brake spring 7 determines the brake-applied position of the braking device 11 as shown in FIG. 2b. With a pull on the pull wire 4a, the brake lever 6 is pivoted in the direction of arrow 36 opposite to the direction of arrow 35 whereby the brake band 8 is lifted away from the clutch drum 9 thereby releasing the latter. The clutch drum 9 can rotate when the centrifugal clutch is engaged.

FIGS. 2a and 2b show the initial position of the arrangement of the invention for actuating the braking device 11 by means of the throttle lever 2 journalled in the handle portion 1.

If the throttle lever 2 is depressed in the direction of arrow 37 (FIG. 3a), then the throttle lever 2 pivots in the direction of arrow 12 about the bearing pin 27 until the edge of the recess 26 comes into contact engagement with the cylindrical follower 13. This pivoting movement of the throttle lever 2 causes a pull on the pull wire 4a in the direction of arrow 40 while the drag lever 3 remains at rest. In this way, no force acts on the pull wire 5a in the direction of arrow 50. Because of the displacement of the pull wire 4a in the direction of arrow 40, the brake lever 6 pivots in the direction of arrow 36 about the pivot axis 31 against the force of the brake spring 7 thereby lifting the brake band 8 away from the clutch drum 9. The brake arrangement 11 is released and the clutch drum 9 can freely rotate.

Figure 3B:
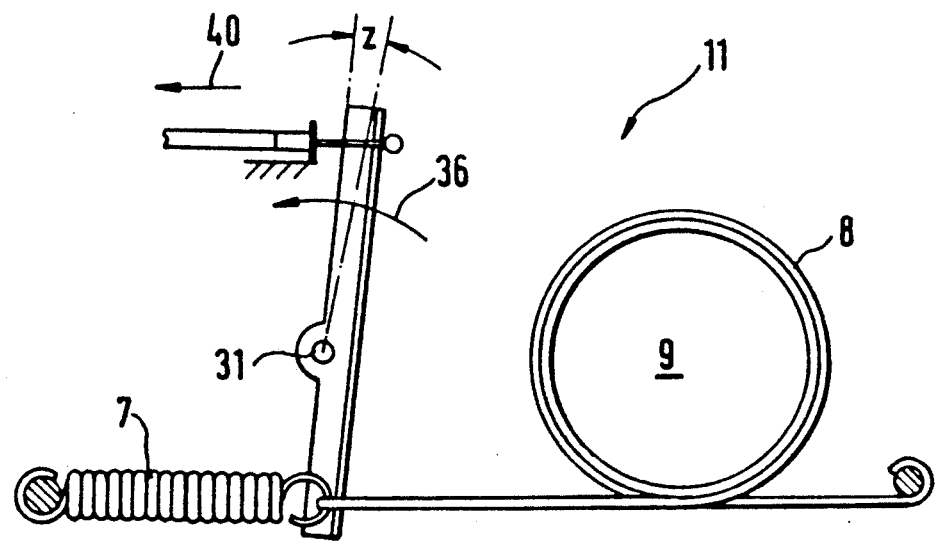

The idle movement path of the throttle lever 2 in the direction of arrow 12 corresponds approximately to the play (u) between the cylindrical follower 13 and the recess 26. This play (u) is therefore so selected that it corresponds to the pivot path (z) of the brake lever 6 from the brake-applied position (FIG. 2b) into the brake-released position (FIG. 3b).

If the throttle lever 2 is pressed down to the full throttle position (FIG. 4a), then the follower 13 is taken along after the edge of the recess 26 contact engages the follower 13 and, in this way, the pull wire 5a of the actuator 5 is also displaced in the direction of arrow 50. The throttle member of the carburetor is fully opened so that the engine runs up to the maximum speed. The further displacement of the pull wire 4a in the direction of arrow 40 is without significance for the braking arrangement 11. Although the brake lever 6 is pivoted further in the direction of arrow 36, this has however no further effect on the brake-released position since the brake-released position has already been reached after passing through the pivot path (z).

In the handle portion, a latch pin 23 is provided which is displaceable in the pivot plane of the drag lever 3 when the engine is started. The throttle lever 2 is first fully depressed as shown in FIG. 4a and then the latch pin 23 is pressed into the pivot plane of the drag lever. If the throttle lever 2 is now released, then the throttle lever is pivoted back into its rest position shown in FIG. 2a opposite the direction of arrow 12 via the pull wire 4a. The drag lever 3 follows the movement of the throttle lever 2 opposite the direction of arrow 12 until the latch recess 22 comes into contact engagement with the latch pin 23 and a further return movement of the drag lever 3 opposite to the direction of arrow 12 is prevented. The latch recess 22 is formed in the free end 21 of the drag lever 3. The latch pin 23 is configured so as to be approximately cylindrical in order to assure a reliable journalling and the latch recess 22 is configured so as to have the shape of a half circle.

The drag lever 3 assumes a half-throttle position in the latched position shown in FIG. 5a (start position) in which the internal combustion engine can, for example, be started with a pull-rope starter. Since the pull wire 4a is not displaced in the direction of arrow 40, the brake lever 6 is pivoted back into the brake-applied position of the braking device 11 in the direction of arrow 35 under the action of spring 7 wherein the brake band 8 brings the clutch drum 9 to standstill. In this way, it is assured that the work tool is at standstill during starting of the engine so that the danger of injury when starting such a work apparatus is reduced. FIG. 5a corresponds to the brake-applied position of the braking device 11 in the manner shown in FIG. 2b for the rest position of the drag lever 3.

After starting the engine, the throttle lever 2 is pressed down into the full throttle position (FIG. 4a) with the drag lever 3 being lifted from the latch pin 23. The latch pin 23 moves, for example under the action of a return spring, into a not-in-use position so that the drag lever 3 can pivot back into the idle position (FIG. 2a).

It is understood that the foregoing description is that of the preferred embodiments of the invention and that various changes and modifications may be made thereto without departing from the spirit and scope of the invention as defined in the appended claims.

What is claimed is:

1. An arrangement for actuating a braking device for braking a movable work tool of a work apparatus so as to bring the work tool to standstill, the work apparatus having a motor for driving the work tool and the arrangement comprising:

a brake lever operatively connected to said braking device so as to be movable between a brake-applied position wherein said braking device brakes said work tool and a brake-released position wherein the braking device releases said work tool so as to permit movement thereof;

a throttle lever pivotally mounted on said work apparatus so as to be movable over a path between a rest position and a full-throttle position;

first actuator means connecting said throttle lever to said brake lever for moving said brake lever into said brake-released position when said throttle lever moves from said rest position toward said full-throttle position;

a drag lever pivotally mounted on said work apparatus so as to be pivotally movable relative to said throttle lever and between a first position and a full-throttle position;

second actuator means connecting said drag lever to the motor for controlling the speed of the motor in dependence upon the movement of said drag lever;

releasable engaging means for permitting said throttle lever to releasably engage said drag lever after said throttle lever has moved over a predetermined portion of said path thereby controlling the speed of the motor via said drag lever and said second actuator means, said throttle lever and said drag lever being mounted on said work apparatus so as to lie in respective mutually parallel planes; and, common pivot means for pivotally mounting said levers on said apparatus so as to pivot about a common axis.

2. The arrangement of claim 1, said engaging means including a follower formed on said drag lever so as to overlap said throttle lever thereby enabling said throttle lever to engage said drag lever at said follower.

3. The arrangement of claim 2, said engaging means further including a recess formed in said throttle lever so as to be spaced from said follower by a spacing (u) when said levers are in said rest positions, respectively.

4. The arrangement of claim 1, further comprising latch means for releasably latching said drag lever in a half-throttle position.

5. The arrangement of claim 1, each of said levers having an approximate L-shape defining two legs, one of said legs being shorter then the other one of said legs, and each of the shorter legs having respective outer ends; and, said pivot means pivotally holding said levers at said outer ends.

6. The arrangement of claim 5, further comprising latch means for releasably latching said drag lever in a predetermined position between said rest position thereof and said full-throttle position thereof.

7. The arrangement of claim 6, said latch means including a recess formed on the longer arm of said drag lever and a latch pin displaceably mounted on said work apparatus so as to be displaceable between a latch position for engaging said recess to latch said drag lever and an unlatch position for disengaging said recess to unlatch said drag lever.

8. The arrangement of claim 5, each of said levers having a connecting region at which the shorter arm joins to the longer arm; said first actuator means being connected to said throttle lever at the connecting region thereof; and, said second actuator means being connected to said drag lever at the connecting region thereof.

9. The arrangement of claim 8, said first actuator means being a pull wire connected to said connecting region of said throttle lever and said second actuator means being a pull wire connected to said connecting region of said drag lever.

* * * * *

UNITED STATES PATENT AND TRADEMARK OFFICE
CERTIFICATE OF CORRECTION

PATENT NO. : 5,042,626

DATED : August 27, 1991

INVENTOR(S) : Hans-Peter Dohse and Jochen Kramer

It is certified that error appears in the above-identified patent and that said Letters Patent is hereby corrected as shown below:

In the title page, in the Abstract, in line 12: delete "throtle" and substitute -- throttle -- therefor.

In column 6, line 31: delete "first" and substitute -- rest -- therefor.

In column 6, line 41: delete "," and substitute -- ; -- therefor.

Signed and Sealed this

Twenty-seventh Day of April, 1993

Attest:

MICHAEL K. KIRK

*Attesting Officer*     Acting Commissioner of Patents and Trademarks